United States Patent [19]
Tajiri et al.

[11] Patent Number: 5,648,027
[45] Date of Patent: Jul. 15, 1997

[54] POROUS CARBONACEOUS MATERIAL AND A METHOD FOR PRODUCING THE SAME

[75] Inventors: Hiroyuki Tajiri, Kitakatsuragi-gun; Yoshiteru Nakagawa, Yamatokoriyama; Yoshiaki Iwaya, Yasu-gun; Yoshiharu Tanaka, Uji; Keiichi Asami, Kyoto; Katsuyuki Touma, Kitakatsuragi-gun; Shinji Okumura, Yahata, all of Japan

[73] Assignees: Osaka Gas Company Ltd., Osaka-fu; Unitika Limited, Hyogo-ken, both of Japan

[21] Appl. No.: 332,063

[22] Filed: Nov. 1, 1994

[30] Foreign Application Priority Data

Nov. 1, 1993 [JP] Japan ................................... 5-297443
Nov. 1, 1993 [JP] Japan ................................... 5-297444
Apr. 22, 1994 [JP] Japan ................................... 6-084422

[51] Int. Cl.$^6$ ................................................. B29C 65/00
[52] U.S. Cl. ......................... 264/43; 264/29.1; 264/45.1; 264/45.2; 264/45.3; 428/166; 428/167; 428/188; 156/306.6
[58] Field of Search .................... 264/43, 29.1, 45.1, 264/45.2, 45.3; 428/166, 167, 188; 156/306.6

[56] References Cited

U.S. PATENT DOCUMENTS 5,021,284  6/1991  Miwa et al. ........................... 428/166

FOREIGN PATENT DOCUMENTS 212816  12/1981  Japan.
214258   7/1983  Japan.
 57716   7/1983  Japan.

Primary Examiner—James J. Seidleck
Assistant Examiner—Duc Truong

[57] ABSTRACT

A slurry containing a precursor fiber convertible to carbon fiber and/or a carbon fiber and, based on 100 parts by weight of the fiber, 10 to 300 parts by weight of a thermosetting resin, e.g. phenol resin, is processed into a random web. This web may contain a pitch or an organic granular material. The web is hot-pressed between a pair of belts while curing of the resin is inhibited to prepare a prepreg sheet. This sheet is disposed, leaving a clearance, in a mold having ribs on a molding surface and heated over the melting point of the resin for expansion and complete cure to provide a porous composite sheet equipped with grooves. This porous composite sheet is carbonized or graphitized to produce a porous carbonaceous material for use as a fuel cell electrode material and so on. This porous carbonaceous material has high homogeneity, gas permeability, electrical conductivity, heat conductivity and mechanical strength.

33 Claims, 4 Drawing Sheets

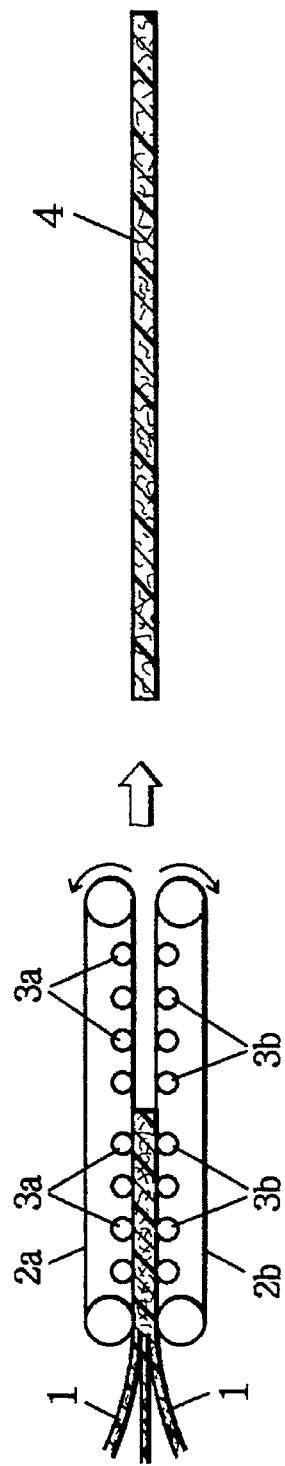
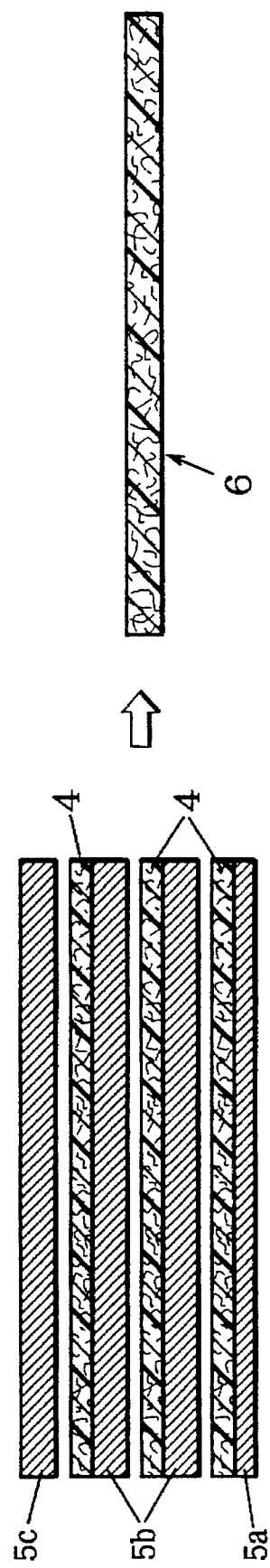

POROUS CARBONACEOUS MATERIAL AND A METHOD FOR PRODUCING THE SAME

FIELD OF THE INVENTION

The present invention relates to a porous carbonaceous material which can be used in the manufacture of electrodes for the phosphoric acid electrolyte fuel cells, electromagnetic shields, electrically conductive sheets, carbonaceous cushioning materials, high-temperature vacuum furnace refractory wall or insulating wall materials, etc., a method for producing a porous composite sheet useful for the production of the porous carbonaceous material, and a method for producing the porous carbonaceous material.

BACKGROUND OF THE INVENTION

Because of their good heat resistance, corrosion resistance, electrical conductivity and mechanical strength, carbonaceous materials are in broad use as fuel cell electrode materials, electromagnetic shielding materials and so on. Among carbonaceous materials, materials in the film or sheet form, such as graphite sheets, can be bonded to, for example, the wall surface to impart heat resistance, corrosion resistance and electromagnetic shielding properties.

However, since a graphite sheet is generally produced by a method which comprises subjecting naturally-occurring graphite serially to acid treatment and heat treatment, mixing the thus-treated graphite with a binder, and compression-molding the mixture into a film or sheet, it is not only non-porous but also is fairly low in electrical conductivity, heat conductivity, mechanical strength and cushioning characteristics, thus being seriously restricted in application.

Meanwhile, a carbon plate can be produced by a process which comprises mixing a textile fiber which can be carbonized or graphitized and/or a carbon fiber with a particulate binder which can be carbonized or graphitized, forming the mixture into a plate under the application of heat and pressure and subjecting the plate to carbonization or graphitization. This kind of carbon plate can be used as, for example, a fuel cell electrode material.

Unlike other kinds of power generating devices, the fuel cell mentioned above is characterized in that the evolution of pollutants such as SOx, NOx and dust is minimal and, moreover, in that it is scarcely a source of noise. Among the known types of fuel cells, the phosphoric acid electrolyte fuel cell comprises a stack of separator-isolated unit cells each comprising a porous negative electrode and a porous positive electrode as disposed on respective sides of the electrolyte. For the provision of gas passageways, usually the surfaces of the negative and positive electrodes are formed with grooves by machining.

For an improved efficiency of conversion to electric energy, the negative and positive electrodes should provide for free control of pore distribution and be high in gas permeability. Further requirements are good electrical conductivity, heat conductivity, mechanical strength, and resistance to phosphoric acids at the operating temperature.

Japanese Patent Publication No. 36670/1989 (JP-B-1-36670) discloses a method for manufacturing a fuel cell electrode plate which comprises dry-mixing a binder, such as a phenolic resin, a carbon fiber and a particulate thermoplastic resin, molding the mixture into a sheet under pressure by means of a hot roll or a hot press and subjecting the sheet to carbonization or graphitization.

However, this method has the disadvantage that because the carbon fiber which is fibrous cannot be uniformly blended with the binder and the thermoplastic resin which are particulate, a segregation tends to occur among the carbon fiber and the binder and the thermoplastic resin in dry-mixing stage and the segregated binder and thermoplastic resin tend to agglomerate in the course of pressure-molding of the particulate composition to reduce the homogeneity of the molding. Furthermore, the segregated thermoplastic resin is re-softened in the carbonization or graphitization stage. The above segregation of the binder and the thermoplastic resin and softening of the thermoplastic resin in two episodes lower the homogeneity of the electrode material. Probably owing to this low homogeneity, the electrode material obtained is not only low in heat conductivity but shows local variations in flexural strength, compressive strength and gas permeability. Further, the segregation of the binder and the thermoplastic resin results in a non-uniformity of pore size distribution of the electrode material. Particularly in the manufacture of electrode plates of reduced thickness, it is difficult to obtain uniform pores.

Japanese Patent Application Laid-open No. 174359/1991 (JP-A-3-174359) discloses a method comprising mixing a carbon fiber with a particulate binder, processing the mixture into a paper-like web, pressure-molding the web and subjecting the molding to carbonization or graphitization. This method, however, has the disadvantage that the molding under heat and pressure must be carried out using a low pressure setting in order to secure a porosity of 60 to 80%. If the molding is carried out under such low pressure, the attainable interfilament bond strength is so low that the sintered electrode material shows only a low flexural strength, i.e. 1 kgf/mm$^2$ at most, and low compressive strength, i.e. 0.4 kgf/mm$^2$ at most, thus failing to meet the performance requirements of electrodes for phosphoric acid electrolyte fuel cells. Moreover, such electrode material has a high volume resistivity in thickness direction and a low heat conductivity.

Japanese Patent Application Laid-open No. 76821/1991 (JP-A-3-76821) discloses a method for manufacturing an electrode material which comprises mixing an organic precursor fiber convertible carbon fiber with a pulp, an organic polymer as a binder, etc., processing the mixture into a paper-like web, and sintering the web to provide an electrode material. However, the carbonization yield (residual carbon rate) of the organic fiber is as low as 10 to 30%. Therefore, the resulting electrode material shows a considerable shrinkage as compared with a corresponding molded material and assuming that an electrode plate measuring 1–3 mm in thickness and 1 m square is manufactured, it undergoes cracking, curling or twisting and, hence, no sufficient uniformity can be expected. Moreover, since the rate of shrinkage in thickness direction is high, local variations in gas permeability and volume resistivity are inevitable, thus failing to ensure a sufficient homogeneity.

In addition, machining is required for forming grooves on the surface of the electrode materials manufactured by the above-mentioned prior art methods. Therefore, the production process for electrodes is complicated. Moreover, since carbonaceous electrode plates are hard, groove-shaped gas passageways can hardly be formed with high efficiency and high accuracy and, moreover, the possible incidence of cracks in the electrode material due to machining detracts from the production efficiency of electrodes.

Meanwhile, in order to realize reductions in weight of carbonaceous materials, it is instrumental to increase their porosity but a reduction in weight is reflected in an amplified decrease in mechanical strength.

Referring to a porous composite sheet, Japanese Patent Publication No. 55618/1992 (JP-B-4-55618) discloses a low-density fiber-reinforced thermoplastic composite which can be used advantageously as a light-weight resin sheet with high flexural strength and flexural rigidity. This composite material can be obtained by subjecting a compressed fiber-reinforced composite containing a thermoplastic synthetic resin and a reinforcing fiber to heat treatment for expansion. Japanese Patent Publication No. 17249/1993 (JP-B-5-17249) discloses a method for producing a porous composite sheet of open-cell structure with high mechanical characteristics which comprises impregnating a reinforcing web, such as a nonwoven polyester fabric, with a specified type of phenolic resin, drying the impregnated web, and curing the phenolic resin under application of pressure and heat.

However, none of the prior art literature pay consideration to carbonization or graphitization. Further, even if these composites are carbonized or graphitized, not only the carbonization yield is low but also the heat conductivity, electrical conductivity and mechanical strength are insufficient, thus being inadequate for electrode use. Moreover, the carbonization or graphitization step must be followed by a machining step for the formation of said groove-shaped gas passageways.

SUMMARY OF THE INVENTION

The primary object of the present invention, therefore, is to provide a porous carbonaceous material having high mechanical strength despite light-weight as well as high homogeneity, high heat conductivity and high gas permeability and a method for producing such material.

It is a further object of the present invention to provide a porous carbonaceous material having groove-shaped gas passageways formed with high accuracy and a method for producing such material.

It is a still another object of the present invention to provide a porous carbonaceous material having high heat conductivity which is of value as an electrode material and a method for producing such material.

It is a still further object of the present invention to provide a porous carbonaceous material which is useful for a fuel cell carbon electrode and a method for producing such material.

It is another yet object of the present invention to provide a method by which a porous composite sheet which is useful for the production of the porous carbonaceous materials can be easily produced.

A still further object of the present invention is to provide a method by which a porous composite sheet which is useful for the production of a porous carbonations material having accurate groove-shaped gas passageways can be efficiently produced without processing or machining step.

The inventors of this invention did much research for accomplishing the above-mentioned objects and found (1) that when a paper-like web formation containing a carbon fiber and a thermosetting resin is molded into a sheet under application of heat and pressure with the hardening of the resin being suppressed and the thus-molded prepreg sheet is heated at a temperature of the melting temperature or more of the resin, the sheet expands to become porous on release of internal stress and (2) that when the above sheet is disposed in an internally ribbed mold leaving a clearance from the mold wall and heated in situ, expansion of the sheet results in the formation of grooves serving as gas passageways which are complementary to the internal geometry of the mold. This invention has been developed on the basis of the above findings.

Thus, the porous carbonaceous material of the present invention has a compression modulus of not less than 5.0 kgf/mm$^2$, a heat conductivity in thickness direction of not less than 2.0 kcal/m·hr·° C., a gas permeability of not less than 850 ml·mm/hr·cm$^2$·mmAq, and a bulk density of 0.55 to 0.75 g/cm$^3$.

In one process of the present invention, a paper-like web containing a precusor fiber convertible to carbon fiber and/or a carbon fiber and a carbonizable or graphitizable thermosetting resin is hot-pressed while curing of the resin is inhibited and the resulting prepreg sheet is heated again at a temperature of the melting point of the resin or more for expansion and complete curing of the resin to thereby provide a porous composite sheet. In practicing the process, the prepreg sheet may be heated again without application of pressure for the expansion and complete curing of the resin. Alternatively, the prepreg sheet may be disposed in a metal mold leaving a clearance and heated again at a temperature of the melting point of the resin or more for expansion and complete curing of the resin. As examples of the metal mold that can be used, a mold having smooth molding opposed surfaces and a mold having internal ribs on at least one molding surface may be mentioned. As a further alternative, the porous composite sheet may be produced by hot-pressing the sheet in a mold having grooves on one molding surface while curing of the thermosetting resin is inhibited, disposing the resulting ribbed sheet, leaving a clearance, in a mold having grooves on one molding surface, and heating again the sheet at a temperature of the melting point of the resin or more for expansion and complete curing of the resin.

The above-mentioned web may comprise a precursor fiber convertible to carbon fiber and/or a carbon fiber, a thermosetting resin and a pitch. The web may further contain a particulate organic substance as a pore-forming agent.

In a further process of the present invention, the porous composite sheet is carbonized or graphitized to produce a porous carbonaceous material. This porous carbonaceous material can be used in a variety of applications, for example as a fuel cell electrode material.

As used throughout this disclosure, the term "complete curing" means that the proportion of the non-cured resin in the cured thermosettig resin is less than 5% by weight. The term "carbonization" means calcination or firing of a carbonizable material at a temperature of, for example, about 450° to 1500° C. The term "graphitization" means calcination or firing of a graphitizable material at a temperature of, for example, about 1500° to 3000° C., regardless of whether the product will have the crystal structure of graphite or not. The term "carbonization yield" means the percentage of residual carbon after the carbonization or graphitization of a carbonizable or graphitizable material.

The term "carbon fiber" means any carbonized or graphitized fiber. The term "flame retardation treatment" means a heat treatment of any fiber other than pitch-based fibers which is conducted in the presence of oxygen at a temperature of about 200° to 450° C. so as to form a heat-resistant surface layer and thereby prevent thermal fusion of its monofilaments. The term "infusiblization" means a heat treatment of any pitch-based fiber in the presence of oxygen at a temperature of about 200° to 450° C. so as to form a heat-resistant surface layer and thereby prevent thermal fusion of its monofilaments.

BRIEF DESCRIPTION OF THE DRAWINGS

FIG. 1 is a flow diagram illustrating a process for producing a porous composite sheet according to the present invention;

DETAILED DESCRIPTION OF THE PREFERRED EMBODIMENT OF THE INVENTION

Figure 2:
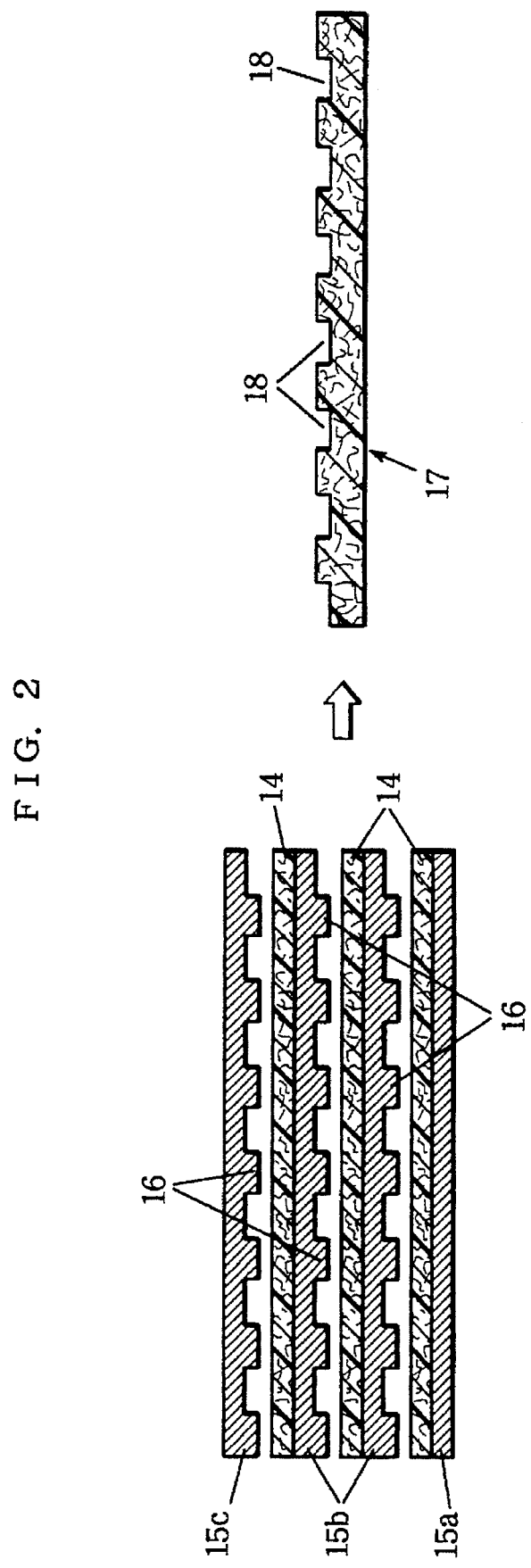
FIG. 2 is a flow diagram illustrating another process for producing a porous composite sheet according to the present invention.

The present invention is now described in detail, where necessary, with reference to the accompanying drawings.

The porous carbonaceous material of the present invention is characterized in that it has many meritorious properties, even though it is light-weight, not found in the conventional materials of comparable weight. This porous carbonaceous material is a porous artifact comprising a carbonized or graphitized carbon fiber and a carbonized or graphitized resin component and has the following characteristics.

(1) Compression modulus of elasticity (kgf/mm$^2$): not less than 5.0, preferably not less than 6.0
(2) Heat conductivity (kcal/m·hr·°C.): not less than 2.0, preferably about 3.0 to 10.0
(3) Gas permeability (ml·mm/hr·cm$^2$·mmAq): not less than 850, preferably about 1000 to 4000, and for still better results, about 1500 to 3500
(4) Bulk density (g/cm$^3$): about 0.55 to 0.75, preferably about 0.6 to 0.7

Moreover, the porous carbonaceous material of the present invention shows practically a flexural strength (kg/cm$^2$) of not less than 130, preferably about 150 to 400, and a compressive strength (kg/cm$^2$) of not less than 50, preferably about 50 to 200.

Furthermore, the heat conductivity (kcal/m·hr·° C.) of the porous carbonaceous material in thickness direction is not less than 2.0, preferably about 3.0 to 10.0.

This porous carbonaceous material can be formed in various shapes according to intended uses and is practically in the plate form. Furthermore, the plate may be formed with groove-like, grate-like or other recessed form depending on the intended use on at least one surface thereof.

The process for producing a porous composite sheet as an intermediate useful for the manufacture of the porous carbonaceous material of the present invention comprises (A) a heat-pressing step for pressing a web into a sheet under heat and pressure and (B) an expansion-curing step for causing expassion of the sheet and complete cure of the component resin.

The web mentioned above comprises a precursor fiber convertible to carbon fiber and/or a carbon fiber and a carbonizable or graphitizable thermosetting resin.

The above-mentioned fiber convertible to carbon fiber includes a variety of fibers which can be precursors of carbon fiber, for example various organic fibers such as polyacrylonitrile fiber, phenolic resin fiber, regenerated cellulose fiber (e.g. rayon, polynosics, etc.), cellulosic fiber, etc., pitch-based fiber and rayon pulp. The precursor fiber convertible to carbon fiber may have been subjected to fire retardation treatment or infusiblization treatment. More than one species of the precursor fiber convertible to carbon fiber can be employed in combination.

The filament diameter of the precursor fiber convertible to carbon fiber may for example be about 5 to 150 μm, preferably about 10 to 50 μm, and more preferably about 15 to 45 μm. If the filament diameter is less than 5 μm, the gas permeability of the porous carbonaceous material tends to be decreased. On the other hand, if the diameter exceeds 150 μm, the pore size of the porous carbonaceous material will be so large that when the material is used as the electrode for a phosphoric acid or other electrolyte fuel cell, the phosphoric acid or other electrolyte tends to obstruct the pores to reduce the gas permeability of the electrode.

The carbonization yield of the precursor fiber convertible to carbon fiber may for example be about 10 to 50%. Therefore, with the progress of carbonization or graphitization, the fiber not only is converted to a carbon fiber acting as a reinforcing agent or material but undergoes a reduction in volume of, for example, about 30 to 70% so that interstices are formed in the thermoplastic resin matrix and, hence, the gas permeability of the carbonaceous material is improved.

As an example of the carbon fiber mentioned above, a carbon fiber obtained by subjecting the precursor fiber convertible to carbon fiber to carbonization or graphitization can be mentioned. The carbon fibers may also be used single or in combination. The mean monofilament diameter of carbon fiber may for example be about 2 to 100 μm, preferably about 5 to 50 μm, and more preferably about 5 to 30 μm. For practical purposes, a carbon fiber with a mean filament diameter of about 10 to 25 μm can be employed. If the filament diameter is less than 2 μm, the gas permeability tends to be decreased. On the other hand, if the limit of 100 μm is exceeded, the pore size of the porous carbonaceous material tends to become too great. When the porous carbonaceous material is to be used as an electrode material, the mean pore diameter of the material is preferably about 10 to 40 μm, typically speaking.

The carbon fiber not only functions as a reinforcing component for increasing the flexural strength and compressive strength of the porous carbonaceous material but inhibits contraction of the porous carbonaceous material in the plane direction during carbonization or graphitization.

As the precursor fiber convertible to carbon fiber or the carbon fiber, generally short staples are employed. The filament length of such short staples may for example be about 0.05 to 20 mm (e.g. 0.1 to 10 mm), preferably about 1 to 10 mm (e.g. 0.5 to 3 mm). The filament length of the carbon fiber contributes mainly for the flexural strength, electrical conductivity and heat conductivity of the porous carbonaceous material. If the monofilament length exceeds 20 mm, the thermal expansion is restrained so that the pore size distribution can hardly be controlled. If the monofilament length is less than 0.05 mm, the rate of thermal expansion is too small and the strength and other properties tend to be sacrificed.

The precursor fiber convertible to carbon fiber and the carbon fiber may respectively be used singly but it is preferable that at least the carbon fiber is included. Moreover, the combined use of a fiber convertible to carbon fiber and a carbon fiber results in improved gas permeability and strength. The ratio of the precursor fiber convertible to carbon fiber to the carbon fiber can be selected according to the desired strength and electrical conductivity of the porous carbonaceous material and may for example be about 10/90 to 90/10 (weight %), preferably about 25/75 to 75/25 (weight %), and more preferably about 30/70 to 70/30 (weight %). If the proportion of the carbon fiber is smaller than 10 weight %, the porous carbonaceous material tends to be low in mechanical strength and show a comparatively great shrinkage. On the other hand, if the proportion of the carbon fiber exceeds 90 weight %, the gas permeability of the porous carbonaceous material tends to decrease.

The thermosetting resin which can be carbonized or graphitized includes, for example, phenolic resin, furan resin, furfural or furan resin-modified phenolic resin, and copna resin. The phenolic resin includes the thermosetting phenolic resin obtainable by reacting a phenol compound with an aldehyde and the thermosetting nitrogen-containing resin obtainable by reacting a phenol compound with an aldehyde and a nitrogen-containing compound. Among such thermosetting resins, phenolic resins are particularly preferred. These thermosetting resins may be generally used in a particulate form or in the form of a dispersion and at least one kind of such resin can be employed.

The carbonization yield of such thermosetting resin may be about 40 to 75 weight % and preferably about 50 to 75 weight % in order to maintain the necessary mechanical strength and to control the porosity of the porous carbonaceous material. Incidentally, the carbonization yield of the phenolic resin is generally as high as 65 to 75 weight %.

The amount of the thermosetting resin can be selected according to the required strength of the porous carbonaceous material and is about 10 to 300 parts by weight (e.g. 15 to 275 parts by weight) and preferably about 20 to 250 parts by weight (e.g. 25 to 200 parts by weight) relative to 100 parts by weight of the fiber component comprising the precursor fiber and carbon fiber. If the amount of the thermosetting resin is less than 10 parts by weight, the mechanical strength of the porous carbonaceous material tends to decrease. On the other hand, if the limit of 300 parts by weight is exceeded, the gas permeability of the carbonaceous material tends to be sacrificed.

The random web mentioned above may contain a pitch. Inclusion of a pitch contributes a great deal to the heat conductivity of the porous carbonaceous material. It appears that in the calcination of the press-formed intermediate carbonaceous material, the pitch softens and melts within the matrix to enter into the clearances or spaces and the evolved gas of decomposition flows down the clearances and channels created between the precursor fiber and thermosetting resin to communicates with the external atmosphere, thus providing for an open-cell structure. It is also supposed that the pitch component hardens and becomes carbonized or graphitized on the internal surfaces of the clearances. Probably for these reasons, the resulting porous carbonaceous material is remarkably superior to the pitch-free porous carbonaceous material in gas permeability, heat conductivity in thickness direction, and electrical conductivity.

The pitch may be whichever of a petroleum-based pitch or a coal-based pitch. Moreover, whichever of isotropic and anisotropic (mesophase) pitches can be employed. The carbonization yield of the pitch may for example be not less than 50 weight % and preferably not less than 70 weight %. If the carbonization yield is less than 50 weight %, the heat conductivity of the porous carbonaceous material is hardly improved.

Furthermore, the softening point of the pitch may be such that the pitch does not soften or produce gases at the softening or curing temperature of the thermosetting resin and is retained within the resin matrix. Therefore, the softening point of the pitch can be selected usually from the range of about 150° to 400° C. depending on the type of thermosetting resin used. In many instances, the softening point of a useful mesophase pitch is generally about 150° to 400° C. and preferably about 200° to 400° C., while the softening point of a useful isotropic pitch is generally about 150° to 350° C. and preferably about 200° to 325° C. When the precursor fiber convertible to carbon fiber is employed, generally a pitch having a softening point higher than the softening point of the precursor fiber by about 25° to 100° C. may be employed.

The toluene-insoluble fraction of an isotropic pitch may for example be about 40 to 85 weight % (preferably 50 to 80 weight %). The quinoline-insoluble fraction of the isotropic pitch may for example be about 10 to 50 weight % (preferably about 20 to 50 weight %), and the acetone-soluble fraction is about 1 to 25 weight % (preferably 5 to 20 weight %).

The amount of the pitch may be within the range affording to a sufficiently high heat conductivity, namely about 10 to 300 parts by weight (e.g. 15 to 275 parts by weight), preferably about 20 to 250 parts by weight (e.g. 25 to 200 parts by weight), based on 100 parts by weight of the fiber. If the proportion of the pitch is less than 10 parts by weight, the porous carbonaceous material tends to be insufficient in heat conductivity, porosity, and gas permeability. On the other hand, if the proportion of the pitch exceeds 300 parts by weight, the expansion and consequent cracking associated with the gas of decomposition of the pitch tend to occur and the pore size and its distribution tend to become uneven.

The pitch can be generally used in a particulate form, for example a powder with a particle diameter not exceeding 100 µm. If the particle diameter of the pitch exceeds 100 µm, the subsequent calcination or firing tends to produce defects, such as a surface burn or a lofting of the porous carbonaceous material.

The random web mentioned above may contain an organic granular material. The organic granular material may for example be an organic granular substance with a carbonization yield of not greater than 30% by weight. If the carbonation yield exceeds 30%, it is often difficult to produce fine uniform pores or control the porosity rate. The softening point of the organic granular material is preferably not lower than 100° C. and, in many instances, may be lower than the softening point of the pitch by about 25° to 100° C.

The organic granular material includes, among others, powders or granules of various synthetic resins, for example thermosetting resins, inclusive of cured products thereof, such as phenolic resin, epoxy resin, unsaturated polyester resin, melamine resin, diallyl phthalate resin, urea resin, urethane resin, etc., and powders or granules of thermoplastic resins inclusive of synthetic resins such as polyvinyl acetate, ethylene-vinyl acetate copolymer, polyvinyl alcohol, polyvinyl chloride, acrylic polymers, polyesters, nylons, styrenic polymers such as polystyrene, styrene-butadiene copolymer, acrylonitrile-butadiene-styrene copolymer, styrene-acrylate copolymer, etc., polycarbonates, polyacetals, etc., and natural resins such as rosin and their derivatives.

Unlike the thermosetting resin described hereinbefore, the carbonization yield of the phenolic resin mentioned just above is not greater than 30%. These organic particulate materials can be used singly or in combination.

These organic particulate materials function as pore-forming agents to create pores in the carbonaceous material. The organic particulate material is preferably a cured thermosetting resin in the powdery or granular form. The use of such a particulate cured thermosetting resin permits a critical control of porosity rate and pore diameter. Thus, since the particulate cured thermosetting resin does not soften on heating, the morphology of the produced pores correspond to the particle size and amount of the cured resin. Therefore, the pore size and its distribution can be easily controlled to provide a carbonaceous material having a sharp or a broad pore size distribution. For the same reason, a porous carbonaceous material of good homogeneity, high electrical conductivity and high mechanical strength can be obtained.

Furthermore, since the particulate cured resin does not soften in the course of molding under heat and pressure, neither curling nor expansion occurs on release from the mold even if it is less than 1 mm thick and fairly large in area, thus providing for the production of a porous carbonaceous material with good uniformity and dimensional stability. Moreover, since the pore-forming agent does not resoften in carbonization or graphitization, the porous carbonaceous material does not undergo curling, expansion or cracking so that the production yield is high.

The still preferred organic particulate material includes pitch-containing organic particulate materials, particularly organic particulate materials containing the isotropic or mesophase pitch. The most desirable material is a thermosetting resin containing an isotropic or mesophase pitch, for example a powdery or granular material composed of pitch and cured thermosetting resin. The proportion of the pitch in such an organic particulate material is about 10 to 75% by weight and preferably about 25 to 60% by weight.

The particle size of the granular material can be selected according to the desired pore size and is, for example, about 0.1 to 500 µm and preferably about 50 to 300 µm.

The proportion of the organic particulate material can be selected according to the desired porosity and may for example be generally about 10 to 500 parts by weight and preferably about 25 to 300 parts by weight based on 100 parts by weight of the above-mentioned fiber. If the proportion of the organic particulate material deviates from the above range, either the porosity or the flexural strength of the porous carbonaceous material tends to be sacrificed.

The above-mentioned random web has a wet-integrated web structure. The term "web structure" as used herein means a structure comprising a randomly oriented formation of individual fibers, such as Japanese paper and other kinds of paper. Such a random web can be obtained by conventional techniques such as machine paper-making, suction-webbing, hand paper-making and so on. As to the technology for production of a carbon fiber random web, U.S. Pat. No. 4426470 can be referred, for instance, in which carbon fiber and other materials are dispersed in water and integrated into a sheet.

In the preparation of a slurry, the precursor textile fiber convertible to carbon fiber and/or carbon fiber may be beated to provide the short staples. The solids concentration of the slurry can be selected from the range not interfering with the formation of a web structure and may for example be about 0.1 to 2% by weight. To assure a uniform dispersion of the fiber and thermosetting resin, the slurry may be supplemented with a dispersant, stabilizer, viscosity modifier, precipitation inhibitor, etc. Moreover, various other additives such as a thickener, a paper strength improver, a surfactant having flocculant activity, particularly a high molecular weight flocculant and a yied enhancer can be employed. The wet random web thus formed can be dried by heating at a temperature lower than the curing temperature of the thermosetting resin, for example at about 50° to 130° C.

By the above web-forming method, a seggregation-free homogeneous random web can be obtained even by using a fibrous component and a particulate component which cannot be evenly blended by the conventional dry mixing method. Moreover, since the complicated serious of steps inevitable to dry mixing are not involved, the web can be easily prepared. Furthermore, even when the web is compression-molded, the homogeneity of the structure is well maintained. Therefore, even when a thermoplastic resin which softens under heat is used for the organic particulate material, the curling and lofting of the sheet or the porous carbonaceous material, which would occur on molding under heat and pressure or in sintering or calcination (the carbonization or graphitization), due to segregation of the thermoplastic resin is remarkably inhibited so that the homogeniety of the sheet or the porous carbonaceous material is enhanced.

Moreover, when the web is hot-pressed, a sheet having a high uniformity in composition, density and thickness can be obtained even when the thickness is less than 1 mm.

Particularly because the formation includes the thermosetting resin, the web functions as a prepreg. The web as a prepreg can be taken up in the roll form and fed continuously to the heat-pressure stage.

FIG. 1 is a flow diagram illustrating the process for producing a porous composite sheet in accordance with this invention.

In the hot-pressing step (A), the random web 1 obtained by wet integration in a paper-making process is molded or formed under heat and pressure into a sheet form while the curing of the thermosetting resin is inhibited. In this embodiment, a plurality of plies of the web 1 are supplied and fed between a pair of endless belts 2a, 2b provided with an upstream heating zone and a downstream cooling zone and while the curing of the resin is inhibited, and continuously molded or formed under heat and pressure to produce a sheet 4 containing the uncured thermosetting resin. This sheet 4 constitutes a high-density prepreg sheet. In the endless-belt processing, either one or more than one ply of web 1 may be compressed.

Rotatively mounted adjacent to the mutually opposed runs of the endless belts 2a, 2b are a plurality of rollers 3a, 3b which are adapted to maintain the opposed runs of the belts at a predetermined distance from each other. Moreover, a heater as a heating means is disposed on the upstream side of the belts and a fan as a cooling means is disposed on the downstream side.

It may be so arranged that in the advancing direction of the web 1, the clearance between the opposed set of rollers is progressively decreased. In this arrangement, as the web 1 is sandwiched and transported by the pair of endless belts 2a, 2b, it is efficiently compressed into a homogeneous high-density prepreg.

The heating zone can be set at a temperature which inhibits the curing of the thermosetting resin and, yet, melts the resin, for example at about 70° to 170° C., preferably about 100° to 160° C. (e.g. 100° to 150° C.), and more preferably about 110° to 150° C. (e.g. 110° to 140° C.). The pressure load to be applied by the belts 2a, 2b can be judiciously selected, according to the desired density of the high-density prepreg, from the range not adversely affecting the uniformity of prepregs and, thus, may for example be about 2 to 50 kg/cm$^2$, preferably about 3 to 30 kg/cm$^2$, and more preferably about 5 to 20 kg/cm$^2$. The transport speed of the belts 2a, 2b can be selected in consideration of molding efficiency and overall production efficiency.

By molding the web 1 under heat and pressure in the above manner, a sheet-like prepreg with a high density, e.g. about 0.7 to 1.7 g/cm$^3$, preferably about 0.8 to 1.5 g/cm$^3$, and more desirably about 1.0 to 1.4 g/cm$^3$, can be continuously prepared while the curing of the thermosetting resin is inhibited, thus eliminating the need to fill a particulate composition uniformly into a metal mold. The void rate (percentage of void) of the resultant prepreg sheet 4 may for example be about 0 to 40%.

In the hot-pressing step (A), the web 1 can be heated and compressed into a high-density prepreg while curing of the thermosetting resin is inhibited when, for example, a mold consisting of flat plate-configured mold components (members) is employed instead of the pair of endless belts. When a web, or two or more plies of the web, is compression-molded using a mold, the heating temperature can be selected according to the kind of thermosetting resin and may for example be about 80° to 250° C., preferably about 80° to 200° C., and more preferably about 90° to 150° C. (e.g. about 100° to 150° C.). The compression pressure may for example be about 10 to 1000 kg/cm$^2$ and preferably about 50 to 500 kg/cm$^2$. The compression time can be selected according to the temperature and pressure conditions and may in many instances be about 5 to 200 seconds and preferably about 10 to 60 seconds.

In the hot-pressing step (A), the thermosetting resin remains uncured or becomes a B-stage resin. The term "B-stage" means an intermediate stage of curing reaction. The B-stage thermosetting resin softens under heat but is not melted or fluidized.

When the prepreg sheet 4, in which the thermosetting resin remains uncured, is heated again at a temperature over the melting temperature of the resin, the sheet tends to "loft" or expand as the internal stress is released due to melting of the thermosetting resin. Thus, with the melting or softening of the thermosetting resin, the fibers bent up in the composite sheet are allowed to extend.

In the present invention, to obtain a porous composite sheet by taking advantage of this expansion force, the prepreg sheet 4 is subjected to an expansion-curing step (B). Thus, the prepreg sheet 4 is disposed, leaving a clearance, in a mold having a plurality of molding compartments defined by pairs of opposed flat surfaces and heated again at a temperature over the melting point of the thermosetting resin.

In the illustrated embodiment, the mold has three molding compartments defined by a first to a third plate-like mold component (member) 5a, 5b, 5c having flat molding surfaces on both sides and fixed at spaced-apart relation. As shown, a plurality of plies of the prepreg sheet 4 are disposed, leaving a clearance for each ply, in the respective molding compartments defined by the mold components (members) 5a, 5b, 5c. In this manner more than one plies of prepreg sheet 4 can be expansion-cured completely in one operation.

In the above expansion-curing step (B), the expansion (lofting) mainly in thickness direction is accompanied by the increase in porosity of the prepreg sheet 4 and as each prepreg 4 is brought into intimate contact with the molding surface, several plies of the porous composite sheet 6 each having a flat, smooth surfaces complementary to the flat surfaces of the mold components or members 5a, 5b, 5c are obtained. Moreover, as the thermosetting resin undergoes curing, a plurality of plies of a well-integrated porous composite sheet 6 are obtained.

The heating temperature can be selected according to the melting and curing temperatures of the matrix thermosetting resin and is generally about 150° to 250° C. (e.g. 160° to 230° C.) and preferably about 160° to 200° C. The heating time can also be selected as required and may for example be about 5 to 120 minutes and preferably about 10 to 60 minutes. The thermal expansion ratio of the prepreg sheet 4 may for example be about 1.2 to 5 and preferably about 1.5 to 3. The clearance between the sheet 4 and the corresponding mold components 5a, 5b, 5c can be selected according to the expansion ratio and may for example be 0.1 to 4 times, preferably 0.3 to 2.5 times of the thickness of the sheet 4.

After the thermosetting resin has cured completely, the sheet is cooled and taken out from the mold to provide the desired porous composite sheet 6.

FIG. 2 is a flow diagram showing another process for the production of a porous composite sheet according to this invention. It should be understood that the members like those shown in FIG. 1 are represented by the like numerals.

In this embodiment, plies of the prepreg sheet 4 prepared in a hot-pressing step (A) similar to that described hereinbefore are disposed, leaving a clearance for each, in a mold having a plurality of molding compartments each defined by a pair of opposed plate-like mold components, one of which has rib-shaped projections 16, and is heated again in situ at a temperature over the melting temperature of the thermosetting resin or more. Thus, this mold comprises a first flat plate-like mold component or member 15a, a second plate-like mold component or member 15c having projections 16 on its side facing the flat-surfaced plate-like first mold component or member, and a plurality of intermediate mold components or members 15b serially disposed at predetermined intervals between the first and second plate-like mold components 15a, 15c and one side of each intermediate mold component 15c which faces the first flat-faced plate-like mold component 15a is provided with projections 16 while the other side facing the projections 16 of the second mold component 15c is flat. In this arrangement, both sides of each intermediate mold component 15c are utilized for defining molding compartments. These mold components are arranged with a predetermined spacing as shown in FIG. 2 and prepreg sheets 4 are disposed in the molding compartments. In this arrangement, a plurality of plies of the prepreg sheet 4 can be caused to expand and cure completely in one operation.

In this expansion-curing step (B), the expansion (lofting) chiefly in thickness direction is accompanied by the porosity increase of the prepreg sheet 4 and as the sheet 4 is brought into intimate contact with the mold surfaces, grooves complementary to the rib-shaped projections 6 of the mold components 15b, 15c are formed in the porous composite sheet 17 with good accuracy. Moreover, with the curing of the thermosetting resin, a plurality of plies of the highly integrated porous composite sheet 17 are obtained.

The heating temperature, the expansion ratio of the prepreg sheet and the clearance between the mold component and the prepreg can be selected from the above-mentioned ranges. After the thermosetting resin has cured, the sheet is cooled and taken out from the mold, whereby a plurality of plies of the porous composite sheet 17 formed with grooves 18 can be obtained.

To cause prepreg sheets to expand and cure completely in the mold, all that is necessary is to dispose the prepregs in the molding compartments, leaving a clearance, and heating the mold at a temperature of the melting temperature of the thermosetting resin or more. In the expansion-curing step (B) illustrated in FIG. 1, the mold may simply have smooth opposed surfaces and depending on uses for the porous carbonaceous material, the molding surface may be formed in a curved plane. For the production of a sheet-form porous carbonaceous material, the opposed surfaces of the mold are formed in flat planes in many instances. In the expansion-curing step (B) illustrated in FIG. 2, one of the opposed molding surfaces may be provided with projections for the formation of grooves or both opposed surfaces may be formed with such projections. Furthermore, in the expansion-curing step (B) illustrated in FIG. 1 or that illustrated in FIG. 2, it is not necessary to provide a plurality of molding compartments, of course, and it is not essential, either, that the mold component or member is plate-like.

As mentioned hereinbefore, the prepreg sheet has the property to expand on heating. Therefore, in a further embodiment of this invention, the prepreg sheet is simply heated at a temperature of the melting point of the thermosetting resin or more under no load for expansion and complete cure of the resin to provide a porous composite sheet. If the prepreg sheet is heated under no load for expansion and cure without using a mold, the degree of expansion of the prepreg sheet may not be accurately controlled in some cases.

In such cases, the degree of expansion of the prepreg sheet can be controlled by selecting the proper temperature to be applied to the web in the hot-pressing step (A). If, within the range of conditions which are inhibitory to the curing reaction of the thermosetting resin, a relatively higher temperature, for example 100° to 280° C. (e.g. 150° to 270° C.), preferably 170° to 280° C. (e.g. 170° to 250° C., preferably 200° to 250° C.) and more preferably about 200° to 270° C., and a comparatively short heating time are selected so that a B-stage thermosetting resin, i.e. the thermosetting resin cured to a slight degree, can be produced. Since the B-stage thermosetting resin is a resin cured or crosslinked to a limited extent, an excessive expansion of the prepreg sheet can be prevented even when the prepreg sheet is softened by reheating at a temperature over the melting point of the thermosetting resin in the expansion-curing step (B). The heating time in the hot-pressing step (A) can be selected according to the heating temperature and, in many instances, may for example be about 1 to 5 minutes and preferably about 2 to 3 minutes.

The resulting sheet-like prepreg may have a bulk density of 0.5 to 1.5 g/cm$^3$ (e.g. 0.6 to 1.0 g/cm$^3$).

By the above method, a porous composite sheet useful for the production of a porous carbonaceous material can be easily obtained without use of a metal mold.

In a still further embodiment of this invention, for the formation of groove-like gas passageways with good accuracy, a sheet comprising one or more plies of the web is molded under pressure using a first mold having one molding surface formed with groove-like recessions or projections and the resultant ribbed prepreg sheet is disposed, leaving a clearance, in a second mold having one surface formed with groove-like recesses or projections and reheated for expansion and cure of the resin to provide a porous composite sheet.

Prior to the preparation of the ribbed prepreg sheet in the first mold, the web may be press-formed. Thus, a sheet obtained by wet-integration in a paper-making process is dried and, without causing the thermosetting resin to cure, the web or a plurality of plies of the web are hot-pressed and cooled to provide a sheet. The hot-pressing temperature for this purpose can be selected according to the type of thermosetting resin matrix and is generally about 80° to 250° C. and preferably about 100° to 200° C. (e.g. 100° to 150° C.). The pressure may for example be about 3 to 100 kg/cm$^2$, preferably about 3 to 50 kg/cm$^2$, and more preferably about 3 to 30 kg/cm$^2$. The hot-press time is dependent on the temperature and pressure used and can be selected from the range of, for example, about 0.5 to 10 minutes or preferably about 1 to 5 minutes. A sheet can be obtained by cooling after hot-pressing. The cooling step can be carried out under pressure using a cold press at a temperature of about 10° to 50° C. for about 1 to 5 minutes. The sheet obtained by the above preliminary molding operation is about 0.5 to 5 mm thick and weighs about 200 to 3000 g/m$^2$ in many instances.

Figure 3:
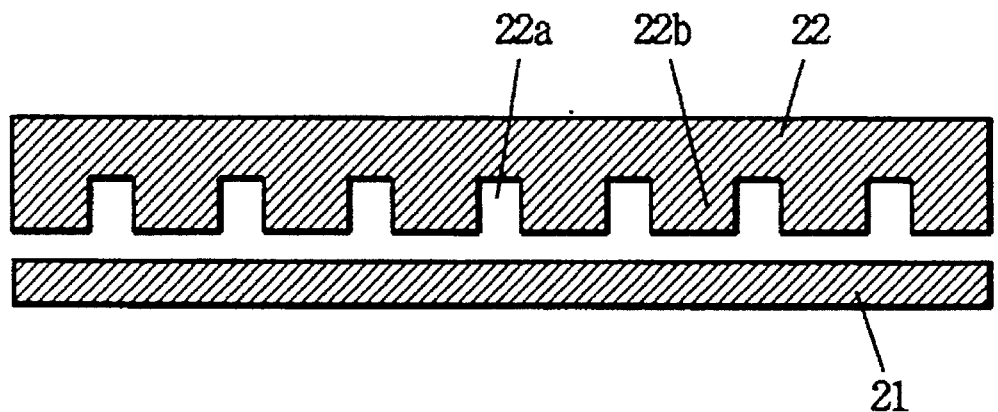
FIG. 3 is a schematic cross-section view showing a first mold.

The above sheet is molded into a ribbed prepreg sheet using the first mold. FIG. 3 is a schematic cross-section view of the first mold. This mold comprises a flat-surfaced lower mold component (member) 21 and an upper mold component (member) 22 having one molding surface formed with groove-like recesses 22a or projections 22b. The above sheet is set between the upper and lower mold components 21, 22 and heated to soften and fluidize the thermosetting resin and, at the same time, press-formed to provide a ribbed prepreg sheet (uncured sheet). The above press-forming operation can be carried out under the same conditions as mentioned for the hot-pressing of the web for the preparation of the prepreg sheet, namely at a heating temperature of about 80° to 250° C., preferably about 80° to 200° C., and more preferably about 90° to 150° C. (e.g. 100° to 150° C.) and a pressure of about 10 to 1000 kg/cm$^2$ and preferably about 50 to 500 kg/cm$^2$. The press time may for example be about 5 to 200 seconds and preferably about 10 to 60 seconds in many instances.

Figure 4:
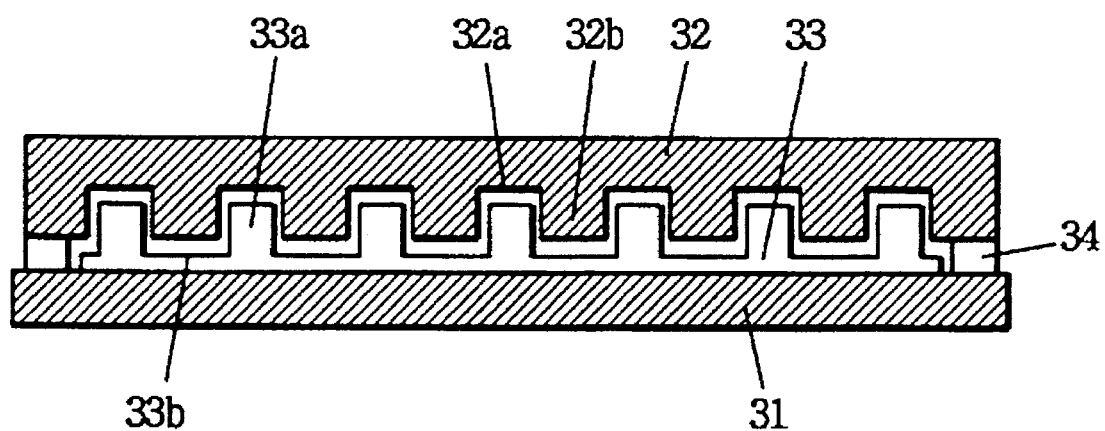
FIG. 4 is a schematic cross-section view showing a molding process using a second mold.

The ribbed prepreg sheet (uncured sheet) thus obtained has the property to expand on heating because, as mentioned hereinbefore, the thermosetting resin matrix thereof remains uncured. In the method of this invention, in order to obtain uniform porous composite sheets, the ribbed prepreg sheet is disposed, leaving a clearance, in a second mold and reheated for expansion and thermal cure. FIG. 4 is a schematic cross-section view showing the forming process using the second mold. Like the first mold described above, this second mold comprises a flat-surfaced lower mold component 31 and an upper mold component 32 having one molding surface formed with groove-like recesses 32a or projections 32b. As shown, the ribbed sheet 33 having projections 33a and groove-like recesses 33b is disposed in the second mold and spacers 34 are disposed at both sides of the lower mold 31 and upper mold 32 to provide for a clearance between the mold and ribbed prepreg sheet 33.

The ribs 33a of the ribbed prepreg sheet 33 are also accommodated, leaving a clearance, in the groove-like recesses 32a of the upper mold component 32. Thus, the groove-like recesses 32a of the second mold are greater in width and depth than the groove-like recesses 22a of the first mold.

As the above mold is reheated at a temperature over the melting temperature of the thermosetting resin, the ribbed prepreg sheet 33 is allowed to expand and cure completely. The heating temperature and heating time may be similar to those mentioned for the expansion-cure step (B) described hereinbefore. By this heat-treatment, an expansion due to resiliency of the carbon fiber is induced to give a ribbed cured porous sheet.

Since, in this process, the porous composite sheet inclusive of its ribs can be uniformly expanded as a whole, the density differential between the ribs and remainder of the porous composite sheet is minimized, thus offering the advantage that a porous composite sheet and a porous carbonaceous material both having a high degree of homogeneity can be obtained.

The porous composite sheet thus obtained is useful for the production of a porous carbonaceous material in the plate form which is light in weight and has high compression modulus and other mechanical strength characteristics, high heat conductivity and high gas permeability. The porous composite sheet formed with groove-like recesses is useful for the production of certain porous carbonaceous materials such as fuel cell electrode materials. Such a porous carbonaceous material can be produced by subjecting the porous composite sheet to calcination or firing, such as carbonization or graphitization.

The calcination temperature is not lower than 800° C., preferably about 1000° to 3300° C., more preferably about 1500° to 3000° C. Practically, the range of about 2000° to 3000° C. is used. The calcination is performed in vacuo, in an inert gas or in, carbon monoxide gas or carbon dioxide gas atmosphere. The inert gas may for example be nitrogen gas, helium gas or argon gas.

Since, in this process, the porous composite sheet containing a cured thermosetting resin is carbonized or graphitized, the resulting porous carbonaceous material has high compression modulus and other mechanical strength characteristics, high gas permeability and good electrical and thermal conductivities even if the formed thickness is less than 1 mm. Moreover, when a porous composite sheet formed with groove-like recesses is carbonized or graphitized, the cutting of fibers due to machining does not occur so that a ribbed porous carbonaceous material having high mechanical strength can be produced. Particularly the porous carbonaceous material obtained from the porous composite sheet of pitch-containing formulation features excellent thermal conductivity characteristics. In addition, the porous carbonaceous material has a homogeneous carbon fiber-reinforced structure. Moreover, the carbon fiber prevents the shrinkage of the porous carbonaceous material in plane and thickness directions so that an improved product uniformity can be insured.

The porous carbonaceous material finds application in a broad range of uses such as fuel cells and other battery electrode materials, electromagnetic shielding materials, electrically conductive sheets, carbonaceous cushioning materials, high-temperature vacuum furnace refractory wall or insulation wall materials, and so on. The porous carbonaceous material is of value as the negative and positive electrodes for fuel cells such as the phosphoric acid electrolyte fuel cells.

Figure 5:
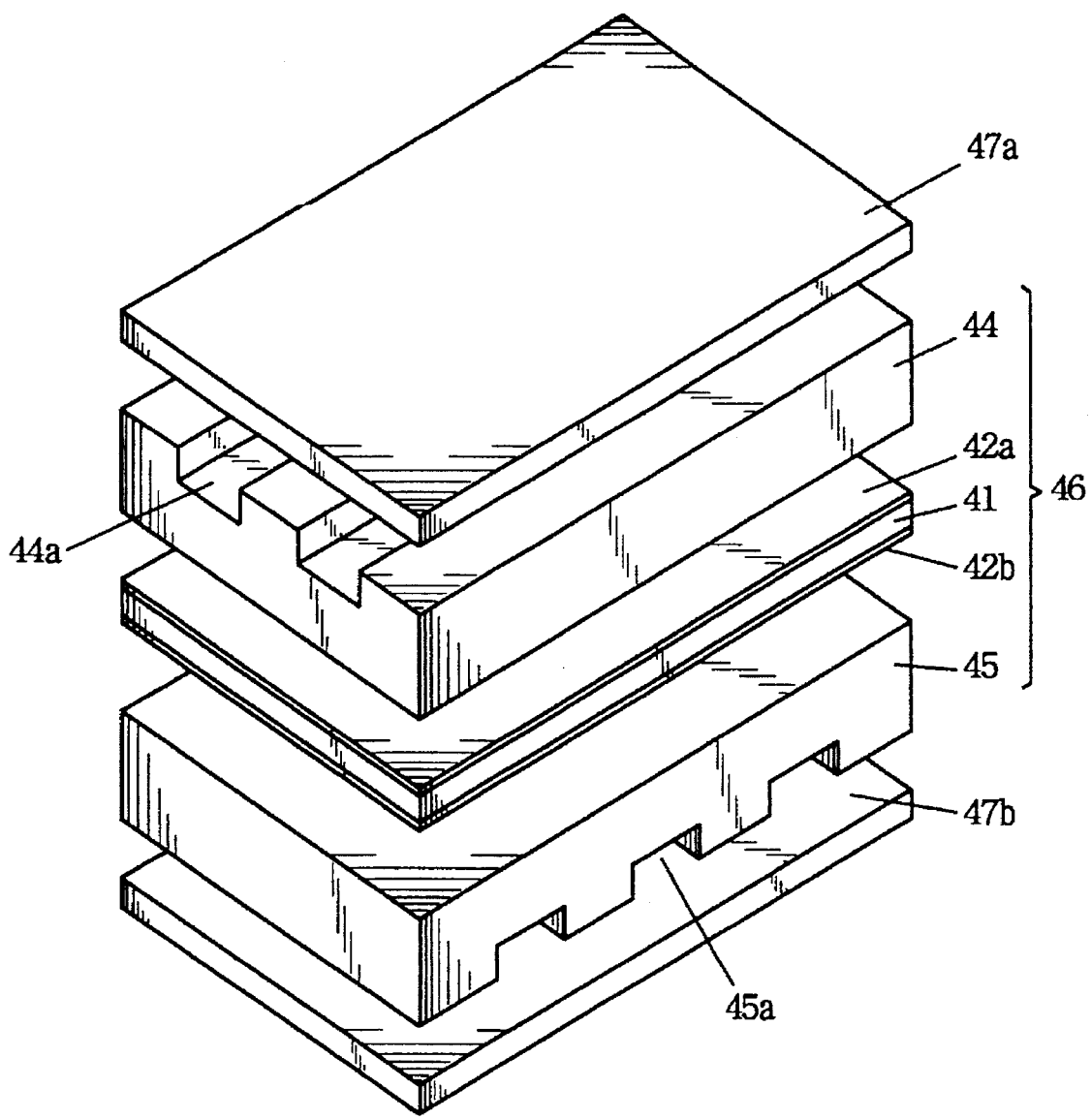
FIG. 5 is a disassembled perspective view showing the construction of a phosphoric acid fuel cell.

The typical phosphoric acid electrolyte fuel cell has the construction illustrated in FIG. 5. Thus, this fuel cell is a stack of unit cells 46 which are isolated by separators 47a, 47b from each other and each of which comprises an electrolyte layer 41 impregnated or saturated with the electrolyte, catalyst-supporting layers 42a, 42b disposed on respective sides of the electrolyte layer, and a negative electrode 44 and a positive electrode 45 as disposed through the catalyst-supporting layers, respectively. The catalyst used for the catalyst-supporting layers is a transition metal such as platinum in many instances. The negative electrode 44 and positive electrode 45 having groove-like gas passageways 44a, 45b are formed using the ribbed porous electrode materials. In the fuel cell illustrated, the gas passageways 44a of the negative electrode 44 are supplied with hydrogen gas and the gas passageways 45a of the positive electrode 45 are supplied with oxygen.

When the negative and positive electrodes are constituted using the plate-like porous carbonaceous material (e.g. a porous carbonaceous material obtained using a mold having flat opposed surfaces), the groove-like gas passageways may be machine-cut. Since the porous carbonaceous material is homogeneous, such groove-like gas passageways can be formed by machining with high accuracy.

The porous carbonaceous material of this invention is lightweight and yet has high mechanical strength characteristics, besides being very satisfactory in homogeneity, electrical conductivity, heat conductivity and gas permeability. Moreover, with regard to the porous carbonaceous material formed with groove-like gas passageways, the dimensional accuracy of the gas passageways is very high. Furthermore, the porous carbonaceous material obtained using a pitch-containing web is so high in thermal conductivity that it is of great use as the electrode material, for example the carbon electrode material for fuel cells.

According to the process of this invention, a porous composite sheet useful for producing the above-described porous carbonaceous material can be efficiently produced in a simple manner, namely allowing the hot-pressed prepreg sheet to thermally expand. Moreover, when the prepreg sheet is heat-expanded in a metal mold, the degree of expansion and degree of porosity gain of the porous composite sheet can be easily controlled and the dimensional accuracy can be further improved. In addition, when a metal mold having inner projections, groove-like gas passageways can be formed with high accuracy by utilizing the force of expansion of the prepreg. This means that no subsequent machining is needed.

In accordance with the production technology of this invention, a porous carbonaceous material having the very meritorious characteristics mentioned above can be manufactured with good productivity by calcining the porous composite sheet. By the calcination of the porous composite sheet having groove-like recesses or projections (ribs), the groove-like gas passageways can be formed with high accuracy and a porous carbonaceous material having excellent homogeneity, gas permeability, electrical conductivity, heat conductivity and mechanical strength characteristics can be produced with high productivity.

The following examples are intended to describe the present invention in further detail and should by no means be construed as defining the scope of the invention.

EXAMPLES

Examples 1 to 15

Random webs (bulk density 0.05 g/cm$^3$) fabricated using the following materials in the proportions indicated in Table 1 and Table 2 were respectively hot-pressed at 140° C. to melt the phenolic resin and thereby provide prepreg sheets with a thickness of 1 mm and a bulk density of 1.2 g/cm$^3$.

Carbon fiber: Pitch-based carbon fiber [Donacarbo S-331, manufactured by Donac, Co., Ltd.]

Rayon fiber: 15 denier×fiber length 3 mm, manufactured by Daiwabo Co., Ltd.

Acrylic fiber: Pyromex (diameter 12 μm), manufactured by Toho Rayon Co., Ltd.

Phenolic resin: Bellpearl S-895, manufactured by Kanebo, Ltd.

Mesophase pitch powder: Manufactured by Osaka Gas Co., Ltd., softening point 320° C., crushed to 200 mesh pass, carbonization yield 80 wt. %.

Isotropic pitch powder: Manufactured by Osaka Gas Co., Ltd., softening point 285° C., crushed to 200 mesh pass, carbonization yield 80 wt. %.

Organic granular material: A cured unsaturated polyester resin [a cured powder of Polymal 9802 (50 to 300 μm) manufactured by Takeda chemical Industries, Ltd.].

In Example 15, a mixture of the above mesophase pitch 50 percent by weight and unsaturated polyester resin 50 percent by weight was cured and, then, crushed to 50 to 300 μm for use as the organic granular material.

Each of the prepreg sheets was disposed in a metal mold comprising of two flat mold components leaving a clearance of 1.8 mm and heated at 170° C. for 30 minutes for expansion and complete cure to provide a porous sheet. This porous sheet was graphitized in an inert gas atmosphere at 2400° C., whereby a porous graphitized carbon plate free of curl and strain was obtained. The various characteristics of these carbon plates were determined. The results are shown in Tables 1 and 2.

TABLE 1

|  | Example 1 | Example 2 | Example 3 | Example 4 | Example 5 | Example 6 | Example 7 | Example 8 |
|---|---|---|---|---|---|---|---|---|
| carbon fiber | 100 | 50 | — | 100 | 100 | — | — | 50 |
| rayon fiber | — | 50 | — | — | — | 100 | 100 | — |
| acrylic fiber | — | — | 100 | — | — | — | — | 50 |
| phenolic resin | 100 | 100 | 100 | 250 | 250 | 100 | 50 | 200 |
| mesophase pitch powder | — | — | — | 100 | — | 250 | — | — |
| isotropic pitch powder | — | — | — | — | 100 | — | 20 | 250 |
| organic granular material | — | — | — | — | — | — | — | — |
| bulk density (g/cm$^3$) | 0.65 | 0.62 | 0.62 | 0.66 | 0.65 | 0.63 | 0.67 | 0.64 |
| compressive elastic modulus (kgf/mm$^2$) | 6.8 | 9.2 | 7.5 | 8.5 | 9.6 | 11.2 | 8.5 | 10.4 |
| heat conductivity in thickness direction (kcal/m · hr · °C.) | 3.6 | 3.1 | 3.2 | 3.7 | 3.3 | 3.1 | 3.8 | 3.3 |
| gas permeability (ml · mm/cm$^2$ · hr · mmAq) | 2500 | 3200 | 3300 | 1800 | 2000 | 2400 | 2700 | 1900 |
| resistance in thickness direction (mΩ · cm) | 25 | 32 | 35 | 31 | 24 | 25 | 26 | 30 |

TABLE 1-continued

|  | Example 1 | Example 2 | Example 3 | Example 4 | Example 5 | Example 6 | Example 7 | Example 8 |
|---|---|---|---|---|---|---|---|---|
| flexural strength (kgf/cm$^2$) | 160 | 180 | 230 | 320 | 300 | 250 | 180 | 190 |
| compressive strength (kgf/cm$^2$) | 90 | 80 | 70 | 70 | 80 | 90 | 110 | 120 |

TABLE 2

|  | Example 9 | Example 10 | Example 11 | Example 12 | Example 13 | Example 14 | Example 15 |
|---|---|---|---|---|---|---|---|
| carbon fiber | 100 | 50 | — | 100 | 70 | — | 100 |
| rayon fiber | — | 50 | — | — | — | 100 | — |
| acrylic fiber | — | — | 100 | — | 30 | — | — |
| phenolic resin | 20 | 150 | 250 | 250 | 150 | 60 | 100 |
| mesophase pitch powder | — | — | 50 | 250 | — | 100 | — |
| isotropic pitch powder | — | — | — | — | 40 | — | — |
| organic granular material | 10 | 250 | 100 | 20 | 100 | 50 | 100 |
| bulk density (g/cm$^3$) | 0.60 | 0.65 | 0.64 | 0.66 | 0.65 | 0.65 | 0.66 |
| compressive elastic modulus (kgf/mm$^2$) | 10.1 | 9.4 | 6.6 | 7.2 | 8.6 | 9.1 | 6.8 |
| heat conductivity in thickness direction (kcal/m · hr · °C.) | 3.0 | 3.7 | 3.4 | 3.8 | 3.5 | 3.0 | 3.8 |
| gas permeability (ml · mm/cm$^2$ · hr · mmAq) | 2300 | 1800 | 2700 | 1700 | 2200 | 2200 | 1900 |
| resistance in thickness direction (mΩ · cm) | 22 | 18 | 30 | 26 | 25 | 24 | 22 |
| flexural strength (kgf/cm$^2$) | 180 | 260 | 240 | 220 | 180 | 180 | 240 |
| compressive strength (kgf/cm$^2$) | 90 | 80 | 90 | 120 | 100 | 120 | 80 |

Comparative Examples 1 to 15

Webs (bulk density 0.05 g/cm$^3$) of the same formulations as those used in Examples 1 to 15 were respectively hot-pressed at 170° C. for 1 hour to cure completely the phenolic resin and the resulting flat sheets were graphitized in an inert gas atmosphere at 2400° C. to provide graphitized carbon plates. The characteristics of those carbon plates were determined. The results are shown in Tables 3 and 4.

TABLE 3

|  | Comp. Example 1 | Comp. Example 2 | Comp. Example 3 | Comp. Example 4 | Comp. Example 5 | Comp. Example 6 | Comp. Example 7 | Comp. Example 8 |
|---|---|---|---|---|---|---|---|---|
| carbon fiber | 100 | 50 | — | 100 | 100 | — | — | 50 |
| rayon fiber | — | 50 | — | — | — | 100 | 100 | — |
| acrylic fiber | — | — | 100 | — | — | — | — | 50 |
| phenolic resin | 100 | 100 | 100 | 250 | 250 | 100 | 50 | 200 |
| mesophase pitch powder | — | — | — | 100 | — | 250 | — | — |
| isotropic pitch powder | — | — | — | — | 100 | — | 20 | 250 |
| organic granular material | — | — | — | — | — | — | — | — |
| bulk density (g/cm$^3$) | 0.63 | 0.66 | 0.63 | 0.65 | 0.64 | 0.66 | 0.65 | 0.64 |
| compressive elastic modulus (kgf/mm$^2$) | 1.4 | 1.5 | 2.0 | 1.3 | 1.5 | 2.6 | 1.8 | 3.2 |

TABLE 3-continued

|  | Comp. Example 1 | Comp. Example 2 | Comp. Example 3 | Comp. Example 4 | Comp. Example 5 | Comp. Example 6 | Comp. Example 7 | Comp. Example 8 |
| --- | --- | --- | --- | --- | --- | --- | --- | --- |
| heat conductivity in thickness direction (kcal/m · hr · °C.) | 0.7 | 1.3 | 0.9 | 1.3 | 1.3 | 1.3 | 0.8 | 1.7 |
| gas permeability (ml · mm/cm$^2$ · hr · mmAq) | 800 | 1000 | 1200 | 900 | 950 | 1200 | 1050 | 1100 |
| resistance in thickness direction (mΩ · cm) | 50 | 55 | 65 | 65 | 50 | 45 | 55 | 55 |
| flexural strength (kgf/cm$^2$) | 120 | 110 | 90 | 120 | 110 | 120 | 115 | 115 |
| compressive strength (kgf/cm$^2$) | 30 | 40 | 45 | 50 | 45 | 40 | 35 | 45 |

TABLE 4

|  | Comp. Example 9 | Comp. Example 10 | Comp. Example 11 | Comp. Example 12 | Comp. Example 13 | Comp. Example 14 | Comp. Example 15 |
| --- | --- | --- | --- | --- | --- | --- | --- |
| carbon fiber | 100 | 50 | — | 100 | 70 | — | 100 |
| rayon fiber | — | 50 | — | — | — | 100 | — |
| acrylic fiber | — | — | 100 | — | 30 | — | — |
| phenolic resin | 20 | 150 | 250 | 250 | 150 | 60 | 100 |
| mesophase pitch powder | — | — | 50 | 250 | — | 100 | — |
| isotropic pitch powder | — | — | — | — | 40 | — | — |
| organic granular material | 10 | 250 | 100 | 20 | 100 | 50 | 100 |
| bulk density (g/cm$^3$) | 0.63 | 0.67 | 0.64 | 0.67 | 0.59 | 0.63 | 0.66 |
| compressive elastic modulus (kgf/mm$^2$) | 2.4 | 1.6 | 2.4 | 1.1 | 1.4 | 1.6 | 1.7 |
| heat conductivity in thickness direction (kcal/m · hr · °C.) | 0.8 | 1.4 | 0.7 | 0.8 | 1.2 | 1.1 | 0.6 |
| gas permeability (ml · mm/cm$^2$ · hr · mmAq) | 750 | 1400 | 1600 | 950 | 1350 | 850 | 1100 |
| resistance in thickness direction (mΩ · cm) | 45 | 55 | 70 | 65 | 50 | 65 | 55 |
| flexural strength (kgf/cm$^2$) | 85 | 115 | 90 | 90 | 115 | 120 | 110 |
| compressive strength (kgf/cm$^2$) | 20 | 45 | 35 | 40 | 45 | 45 | 50 |

Comparison of Tables 1 and 2 with Tables 3 and 4 indicates that the carbon plates obtained in Examples 1–15 are superior to the carbon plates obtained in Comparative Examples 1–15 in compression modulus, gas permeability and heat conductivity despite their relatively low bulk density.

Example 16

Random webs (bulk density 0.05 g/cm$^3$) comprising a pitch-based carbon fiber [Donacarbo S-331, manufactured by Donac, Co., Ltd.; filament diameter of 13 μm] used in Example 1 and a phenolic resin [Bellpearl S-895, manufactured by Kanebo, Ltd.] in a ratio of 40/60 (parts by weight) was hot-pressed at 250° C. for 2 minutes to melt the phenolic resin and thereby provide prepreg sheets with a thickness of 2.3 mm and a bulk density of 0.67 g/cm$^3$.

The prepreg sheet was reheated at 170° C. for 30 minutes under no load for expansion and complete cure to provide a porous sheet. The porous sheet was graphitized in an inert gas atmosphere at 2400° C., whereby a porous graphitized carbon plate free of curl and strain was obtained. The various characteristics of the carbon plates were determined. The results are shown below.

| Bulk density | 0.62 g/cm$^3$ |
| --- | --- |
| Gas permeability | 1100 ml · mm/cm$^2$ · hr · mmAq |
| Heat conductivity in thickness direction | 4.2 kcal/m · hr · °C. |
| Flexural strength | 175 kg/cm$^2$ |
| Compressive strength | 70 kg/cm$^2$ |
| Compressive elastic modulus | 650 kgf/cm$^2$ |
| Resistance in thickness direction | 30 mΩ · cm |

Example 17

A carbon plate was prepared in the same manner as in Example 16 except that random webs comprising a carbon fiber and a phenolic resin in a ratio of 30/70 (parts by weight) was used. The characteristics of the carbon plate is shown below.

| | |
|---|---|
| Bulk density | 0.64 g/cm$^3$ |
| Gas permeability | 1000 ml · mm/cm$^2$ · hr · mmAq |
| Heat conductivity in thickness direction | 4.0 kcal/m · hr · °C. |
| Flexural strength | 190 kg/cm$^2$ |
| Compressive strength | 75 kg/cm$^2$ |
| Compressive elastic modulus | 570 kgf/cm$^2$ |
| Resistance in thickness direction | 32 mΩ · cm |

Examples 18 to 32

Random webs (bulk density 0.05 g/cm$^3$) produced using the materials used in Examples 1 to 15 in the proportions indicated in Table 5 and Table 6 were respectively hot-pressed at 140° C. to melt the phenolic resin and thereby provide prepreg sheets with a thickness of 1 mm and a bulk density of 1.2 g/cm$^3$.

In Example 32, a mixture of the above mesophase pitch (50% by weight) and unsaturated polyester resin (50% by weight) was cured and, then, crushed to 50 to 300 μm for use as the organic granular material.

Each of the prepreg sheets was disposed in a metal mold consisting of a first flat plate-like mold component and a second plate-like mold component having projections (height of projections: 1.5 mm, depth of groove: 0.7 mm, and pitch of groove: 1.0 mm) on its side facing the flat-surface plate-like first mold component leaving a clearance of 2 mm and reheated at 170° C. for 30 minutes for expansion and complete cure to provide a porous sheet. This porous sheet was graphitized in an inert gas atmosphere at 2400° C., whereby a porous graphitized carbon plate free of curl and strain was obtained. The projections of the porous graphitized carbon plate were sliced and the various characteristics of the resulting carbon plates were determined. The results are shown in Tables 5 and 6.

TABLE 5

| | Example 18 | Example 19 | Example 20 | Example 21 | Example 22 | Example 23 | Example 24 | Example 25 |
|---|---|---|---|---|---|---|---|---|
| carbon fiber | 100 | 50 | — | 100 | 100 | — | — | 50 |
| rayon fiber | — | 50 | — | — | — | 100 | 100 | — |
| acrylic fiber | — | — | 100 | — | — | — | — | 50 |
| phenolic resin | 100 | 100 | 100 | 250 | 250 | 100 | 50 | 200 |
| mesophase pitch powder | — | — | — | 100 | — | 250 | — | — |
| isotropic pitch powder | — | — | — | — | 100 | — | 20 | 250 |
| organic granular material | — | — | — | — | — | — | — | — |
| bulk density (g/cm$^3$) | 0.66 | 0.62 | 0.64 | 0.65 | 0.64 | 0.60 | 0.67 | 0.66 |
| gas permeability (ml · mm/cm$^2$ · hr · mmAq) | 2000 | 1800 | 1500 | 1600 | 1800 | 1800 | 1600 | 1700 |
| heat conductivity in thickness direction (kcal/m · hr · °C.) | 3.2 | 3.4 | 3.2 | 3.5 | 3.6 | 3.4 | 3.9 | 3.1 |
| flexural strength (kg/cm$^2$) | 200 | 160 | 175 | 185 | 190 | 150 | 155 | 175 |
| compressive strength (kg/cm$^2$) | 60 | 50 | 55 | 65 | 65 | 50 | 65 | 65 |
| compressive elastic modulus (kgf/mm$^2$) | 680 | 720 | 810 | 800 | 720 | 790 | 640 | 880 |
| resistance in thickness direction (mΩ · cm) | 24 | 22 | 8 | 25 | 31 | 34 | 32 | 18 |

TABLE 6

| | Example 26 | Example 27 | Example 28 | Example 29 | Example 3 | Example 31 | Example 32 |
|---|---|---|---|---|---|---|---|
| carbon fiber | 100 | 50 | — | 100 | 70 | — | 100 |
| rayon fiber | — | 50 | — | — | — | 100 | — |
| acrylic fiber | — | — | 100 | — | 30 | — | — |
| phenolic resin | 20 | 150 | 250 | 250 | 150 | 60 | 100 |
| mesophase pitch powder | — | — | 50 | 250 | — | 100 | — |
| isotropic pitch powder | — | — | — | — | 40 | — | — |
| organic granular material | 10 | 250 | 100 | 20 | 100 | 50 | 100 |

TABLE 6-continued

|  | Example 26 | Example 27 | Example 28 | Example 29 | Example 3 | Example 31 | Example 32 |
| --- | --- | --- | --- | --- | --- | --- | --- |
| bulk density (g/cm$^3$) | 0.60 | 0.65 | 0.64 | 0.66 | 0.65 | 0.65 | 0.66 |
| gas permeability (ml · mm/cm$^2$ · hr · mmAq) | 2300 | 1800 | 2700 | 1700 | 2200 | 2200 | 1900 |
| heat conductivity in thickness direction (kcal/m · hr · °C.) | 3.0 | 3.7 | 3.4 | 3.8 | 3.5 | 3.0 | 3.8 |
| flexural strength (kg/cm$^2$) | 150 | 200 | 160 | 190 | 195 | 155 | 160 |
| compressive strength (kg/cm$^2$) | 55 | 75 | 65 | 55 | 65 | 55 | 55 |
| compressive elastic modulus (kgf/mm$^2$) | 550 | 620 | 610 | 670 | 780 | 710 | 650 |
| resistance in thickness direction (mΩ · cm) | 21 | 22 | 18 | 21 | 25 | 27 | 28 |

Comparison of Tables 5 and 6 with Tables 3 and 4 indicates that the carbon plates obtained in Examples 18 to 32 are superior to the carbon plates obtained in Comparative Examples 1 to 15 in gas permeability, heat conductivity and mechanical strength.

Example 33

A pitch-based carbon fiber having filament length of 3 mm [Donacarbo S-331, manufactured by Donac, Co., Ltd.; filament diameter of 13 μm] used in Example 1 and a phenolic resin [Bellpearl S-895, manufactured by Kanebo, Ltd.] were dispersed in a ratio of 40/60 (parts by weight) in water according to U.S. Pat. No. 4,426,470 to give an aqueous slurry. By use of the slurry, a carbon fiber-reinforced integrated web sheet (weight 400 g/m$^2$) containing 40% by weight of carbon fiber was obtained by paper-making technology.

The resulting integrated random webs (5 plies) were accumulated with a continuous double belts laminator described in U.S. Pat. No. 3,148,269 and, after hot-pressing at 125° C. for 2 minutes under a pressure of about 2000 KPa, a laminated sheet was cooled at 40° C. for 2 minutes under pressure to provide a prepreg sheet having a thickness of 3.1 mm (bulk density 0.65 g/cm$^3$).

The prepreg sheet was disposed in a first mold comprising a flat-surfaced lower mold component and an upper mold component having one molding surface formed with groove-like recesses and projections (width of rib=1.5 mm, width of groove=1.5 mm, height of rib=1.1 mm, depth of groove=0.5 mm, size=170 mm×170 mm) and hot-pressed at 90° C. for 30 seconds under pressure of 100 kg/cm$^2$ to provide a ribbed prepreg sheet (density of rib portion: 1.2 g/cm$^3$, density of non-rib portion: 1.4 g/cm$^3$).

The ribbed prepreg sheet was disposed in a second mold comprising a flat-surfaced lower mold component and an upper mold component having one molding surface formed with groove-like recesses and projections (width of rib=1.4 mm, width of groove=1.4 mm, height of rib=2.0 mm) with use of spacers having thickness of 1.75 mm which were interposed between the lower mold component and the upper mold component and reheated at 170° C. for 40 minutes in an hot air-cycling oven and cooled to room temperature to give a ribbed and cured porous composite sheet (density of rib portion: 0.65 g/cm$^3$, density of non-ribbed portion: 0.68 g/cm$^3$).

After carbonization at 900° C. in a vacuum furnace, the porous composite sheet was graphitized in an inert gas atmosphere at 2700° C., whereby a porous graphitized carbon plate free of curl and strain was obtained. The projections of the porous graphitized carbon plate were sliced and the various characteristics of the resulting carbon plates were determined. The results are shown below.

| | |
| --- | --- |
| Bulk density | 0.68 g/cm$^3$ |
| Gas permeability | 1000 ml · mm/cm$^2$ · hr · mmAq |
| Heat conductivity in thickness direction | 3.6 kcal/m · hr · °C. |
| Flexural strength | 190 kg/cm$^2$ |
| Compressive strength | 65 kg/cm$^2$ |
| Compressive elastic modulus | 600 kgf/cm$^2$ |
| Resistance in thickness direction | 28 mΩ · cm |
| Porosity | 65% |

Example 34

A pitch-based carbon fiber having a mean filament length of 3 mm [Kureca C-103S, manufactured by Kureha Chemical Industry Co., Ltd.; filament diameter of 14.5 μm] and a phenolic resin [Bellpearl S-895, manufactured by Kanebo, Ltd.] were dispersed in a ratio of 30/70 (parts by weight) in water according to U.S. Pat. No. 4,426,470 to give an aqueous slurry. By use of the slurry, a carbon fiber-reinforced integrated web sheet (weight 400 g/m$^2$) containing 30% by weight of carbon fiber was obtained by paper-making technology.

The resulting integrated random webs (6 plies) were accumulated with a continuous double belts laminator described in U.S. Pat. No. 3,148,269 and, after hot-pressing at 125° C. for 2 minutes under a pressure of about 2000 KPa, a laminated sheet was cooled at 35° C. for 3 minutes under pressure to provide a prepreg sheet having a thickness of 2.7 mm (bulk density 0.88 g/cm$^3$).

The prepreg sheet was disposed in a first mold as used in Example 33 and hot-pressed at 80° C. for 30 seconds under pressure of 200 kg/cm$^2$ to provide a ribbed prepreg sheet (density of rib portion: 1.1 g/cm$^3$, density of non-rib portion: 1.2 g/cm$^3$). The ribbed prepreg sheet was disposed in a second mold as used in Example 33 with use of spacers having thickness of 1.80 mm and reheated at 170° C. for 40 minutes in an hot air-cycling oven and cooled to room temperature to give a ribbed and cured porous composite sheet (density of rib portion: 0.63 g/cm$^3$, density of non-ribbed portion: 0.64 g/cm$^3$).

After carbonization at 1000° C. in nitrogen atmosphere, the porous composite sheet was graphitized in an inert gas atmosphere at 2800° C., whereby a porous graphitized carbon plate free of curl and strain was obtained. The projections of the porous graphitized carbon plate were sliced and the various characteristics of the resulting carbon plates were determined. The results are shown below.

| | |
|---|---|
| Bulk density | 0.64 g/cm$^3$ |
| Gas permeability | 1000 ml · mm/cm$^2$ · hr · mmAq |
| Heat conductivity in thickness direction | 2.8 kcal/m · hr · °C. |
| Flexural strength | 230 kg/cm$^2$ |
| Compressive strength | 60 kg/cm$^2$ |
| Compressive elastic modulus | 580 kgf/cm$^2$ |
| Resistance in thickness direction | 35 mΩ · cm |
| Porosity | 69% |

What is claimed is:

1. A process for producing a porous composite sheet which comprises hot-pressing a random web comprising a precursor fiber convertible to carbon fiber and/or a carbon fiber and a carbonizable or graphitizable thermosetting resin while curing of said resin is inhibited to provide a prepreg sheet; and heating said prepreg sheet at a temperature of the melting point of said thermosetting resin or more under no load, for expansion and complete cure of said resin.

2. The process for producing a porous composite sheet as claimed in claim 1, wherein one or more plies of said web is hot-pressed at a temperature of 70° to 280° C. under pressure without complete curing of said resin to provide a prepreg sheet and the resulting prepreg sheet is heated again at a temperature of 150° to 250° C. for expansion and complete cure of said resin.

3. The process for producing a porous composite sheet as claimed in claim 1, wherein said hot-pressing of a web into a sheet is carried out using a pair of endless belts.

4. The process for producing a porous composite sheet as claimed in claim 2, wherein said hot-pressing of a web into a sheet is performed at a temperature of 70° to 170° C. and a pressure of 2 to 50 kg/cm$^2$ to provide a prepreg sheet having a bulk density of 0.8 to 1.5 g/cm$^3$.

5. The process for producing a porous composite sheet as claimed in claim 1, wherein said hot-pressing of a web into a sheet is carried out at 170° to 250° C. and a pressure of 2 to 50 kg/cm$^2$ provide a prepreg sheet having a bulk density of 0.6 to 1.0 g/cm$^3$.

6. The process for producing a porous composite sheet as claimed in claim 4, wherein said prepreg sheet is disposed in a mold, leaving a clearance, and heated at a temperature over the melting point of said thermosetting resin for expansion and complete cure of the resin.

7. The process for producing a porous composite sheet as claimed in claim 4, wherein said prepreg sheet is disposed, leaving a clearance, in a mold having flat opposed molding surfaces and heated at 150° to 250° C. for expansion and cure of said resin.

8. The process for producing a porous composite sheet as claimed in claim 4, wherein said prepreg sheet is disposed, leaving a clearance, in a mold comprising at least one pair of opposed surfaces defining a molding compartment, at least one of said opposed surfaces being provided with a plurality of rib-shaped projections, and heated at 150° to 250° C. for expansion and complete cure of said resin.

9. A process for producing a porous composite sheet which comprises hot-pressing one or more plies of a web wherein a prepreg sheet is disposed in a first mold comprising at least one pair of opposed surfaces defining a molding compartment, at least one of said opposed surfaces being provided with grooves, under heating at 80° to 200° to provide a ribbed sheet and disposing said ribbed sheet, leaving a clearance, in a second mold comprising at least one pair of opposed surfaces defining a molding compartment, at least one of said opposed surfaces being provided with grooves larger than the grooves of said first mold, and heating said ribbed sheet at a temperature of 150° to 250° C. for expansion and complete cure of said resin.

10. The process for producing porous composite sheet as claimed in claim 6, wherein said prepreg sheet is disposed in said mold, leaving a clearance corresponding to 0.1 to 4 times the thickness of said sheet.

11. The process for producing a porous composite sheet as claimed in claim 6, wherein said prepreg sheet in said mold is heated at 150° to 250° C. for expansion and complete cure of the resin.

12. The process for producing a porous composite sheet as claimed in claim 1, wherein said web contains at least the carbon fiber of said precursor fiber convertible to carbon fiber and carbon fiber.

13. The process for producing a porous composite sheet as claimed in claim 1, wherein said web contains said precursor fiber convertible to carbon fiber and carbon fiber in a ratio of 10/90 to 90/10 (% by weight).

14. The process for producing a porous composite sheet as claimed in claim 1, wherein said thermosetting resin is a resin having a carbonization yield of 40 to 75% by weight.

15. The process for producing a porous composite sheet as claimed in claim 1, wherein said thermosetting resin is a phenolic resin.

16. The process for producing a porous composite sheet as claimed in claim 1, wherein said web to be hot-pressed comprises a precursor fiber convertible to carbon fiber and/or a carbon fiber, a thermosetting resin with a carbonization yield of 40 to 75 weight %, and a pitch.

17. The process for producing a porous composite sheet as claimed in claim 1, wherein said web to be hot-pressed comprises 10 to 300 parts by weight of a thermosetting resin and 10 to 300 parts by weight of a pitch relative to 100 parts by weight of the fiber.

18. The process for producing a porous composite sheet as claimed in claim 16, wherein the pitch component of said web to be hot-pressed has a softening point of 150° to 400° C.

19. The process for producing a porous composite sheet as claimed in claim 1, wherein said web to be hot-pressed further contains an organic granular material as a pore-forming agent.

20. The process for producing a porous composite sheet as claimed in claim 19, wherein the organic granular material contained in the web to be hot-pressed is a cured thermosetting resin.

21. The process for producing a porous composite sheet as claimed in claim 19, wherein a web containing an organic granular material composed of a pitch and a resin with a carbonization yield of not greater than 30% by weight is hot-pressed.

22. The process for producing a porous composite sheet as claimed in claim 21, wherein the amount of the pitch based on the whole organic granular material is 10 to 75% by weight.

23. The process for producing a porous composite sheet as claimed in claim 18, wherein a web containing 10 to 500 parts by weight of said organic granular material relative to 100 parts by weight of the fiber is hot-pressed.

24. A process for producing a porous composite sheet as claimed in claim 1, which comprises a prepreg-forming step of hot-pressing a web including a fiber component comprising at least the carbon fiber of said precursor fiber convertible to carbon fiber and said carbon fiber and, based on 100 parts by weight of said fiber component, 20 to 250 parts by weight of a carbonizable or graphitizable thermosetting resin, 0 to 250 parts by weight of a pitch having a softening point of 200° to 400° C. and 0 to 300 parts by weight of an organic granular material as a pore-forming agent using a pair of endless belts at a temperature of 70° to 280° C. to provide a prepreg sheet, and an expansion-curing step of heating said prepreg sheet at a temperature of 150° to 250° C. for expansion and complete cure of the resin.

25. The process for producing a porous composite sheet as claimed in claim 24, wherein the hot-pressing of the web is carried out at 170° to 280° C. in the prepreg-forming step to inhibit curing of said thermosetting resin and the prepreg sheet thus obtained is heated at 150° to 250° C. under no load for expansion and complete cure of the resin in the expansion-curing step.

26. The process for producing a porous composite sheet as claimed in claim 24, wherein the hot-pressing of said web in the hot-pressing step is carried out using a metal mold optionally having groove-like recesses on one of its molding surfaces at a temperature of 80° to 200° C. and a pressure of 2 to 1000 kg/cm² while curing of the thermosetting resin is inhibited and the expansion and cure of the resulting prepreg sheet in the expansion-curing step is carried out by disposing said sheet, leaving a clearance, in a metal mold optionally having groove-shaped recesses on one of its molding surfaces and heating the sheet at a temperature of 150° to 250° C. for expansion and complete cure of the resin.

27. A process of producing a porous carbonaceous material which comprises hot-pressing at least one of a random web comprising a precursor fiber convertible to carbon fiber and/or a carbon fiber and a carbonizable or graphitizable thermosetting resin while curing of said resin is inhibited to provide a prepreg sheet, heating the prepreg sheet at a temperature over the melting temperature of said resin under no load, for expansion and complete cure of the resin, and either carbonizing or graphitizing the resultant porous composite sheet.

28. The process for producing a porous carbonaceous material as claimed in claim 27 wherein said porous composite sheet is calcined at a temperature of 1000° to 3300° C.

29. A process for manufacturing a porous carbon which comprises a step of hot-pressing at least one ply of a random web comprising a fiber component composed of a precursor fiber convertible to carbon fiber and/or a carbon fiber and, based on 100 parts by weight of said fiber component, 15 to 275 parts by weight of a carbonizable or graphitizable thermosetting resin with a carbonization yield of 50 to 75% by weight, 0 to 250 parts by weight of a pitch with a carbonization yield of not less than 50% by weight, and 0 to 250 parts by weight of an organic granular material with a mean particle diameter of 0.1 to 500 µM while curing of said thermosetting resin is inhibited to provide a prepreg sheet;

a step of heating said prepreg sheet at a temperature over the melting temperature of said resin under no load for expansion and complete cure of the resin; and a step of carbonizing or graphitizing the resultant porous composite sheet.

30. A porous composite sheet which is prepared by a process comprising hot-pressing a random web comprising a precursor fiber convertible to carbon fiber and/or a carbon fiber and a carbonizable or graphitizable thermosetting resin while curing of said resin is inhibited to provide a prepreg sheet; and heating said prepreg sheet at a temperature of the melting point of said thermosetting resin or more under no load, for expansion and complete cure of said resin.

31. A porous carbonaceous material which is prepared by a process comprising hot-pressing at least one of a random web comprising a precursor fiber convertible to carbon fiber and/or a carbon fiber and a carbonizable or graphitizable thermosetting resin while curing of said resin is inhibited to provide a prepreg sheet, heating the prepreg sheet at a temperature over the melting temperature of said resin under no load for expansion and complete cure of the resin, and either carbonizing or graphitizing the resultant porous composite sheet.

32. A porous carbonaceous material which is prepared by a process comprising a step of hot-pressing at least one ply of a random web comprising a fiber component composed of a precursor fiber convertible to carbon fiber and/or a carbon fiber and, based on 100 parts by weight of said fiber component, 15 to 275 parts by weight of a carbonizable or graphitizable thermosetting resin with a carbonization yield of 50 to 75% by weight, 0 to 250 parts by weight of a pitch with a carbonization yield of not less than 50% by weight, and 0 to 250 parts by weight of an organic granular material with a mean particle diameter of 0.1 to 500 µm while curing of said thermosetting resin is inhibited to provide a prepreg sheet;

a step of heating said prepreg sheet at a temperature over the melting temperature of said resin under no load for expansion and complete cure of the resin; and a step of carbonizing or graphitizing the resultant porous composite sheet.

33. A porous carbonaceous material which is prepared by a process comprising hot-pressing one or more plies of a web wherein a prepreg sheet is disposed in a first mold comprising at least one pair of opposed surfaces defining a molding compartment, at least one of said opposed surfaces defining a molding compartment, at least one of said opposed surfaces being provided with grooves, under heating at 80° to 200° C. to provide a ribbed sheet and disposing said ribbed sheet, leaving a clearance, in a second mold comprising at least one pair of opposed surfaces defining a molding compartment, at least one of said opposed surfaces being provided with grooves larger than the grooves of said first mold, heating said ribbed sheet at a temperature of 150° to 250° C. for expansion and complete cure of said resin, and either carbonizing or graphitizing the resultant porous composite sheet.

* * * * *